May 2, 1967 C. C. PLUMB 3,317,192
METHOD AND APPARATUS FOR PREPARING A BITUMINOUS CONCRETE MIX
Filed Sept. 20, 1965 2 Sheets-Sheet 1
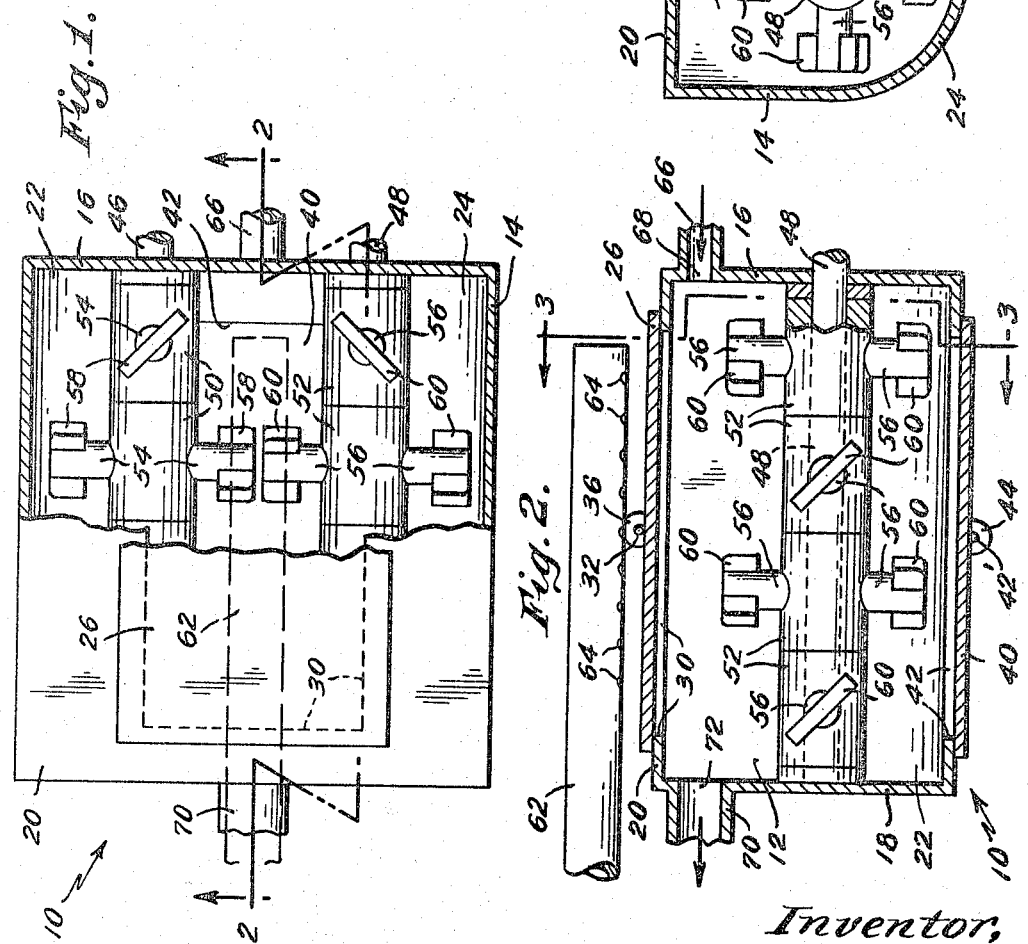
Inventor,
Charles C. Plumb,
by Salter + Michalson
Att'ys.

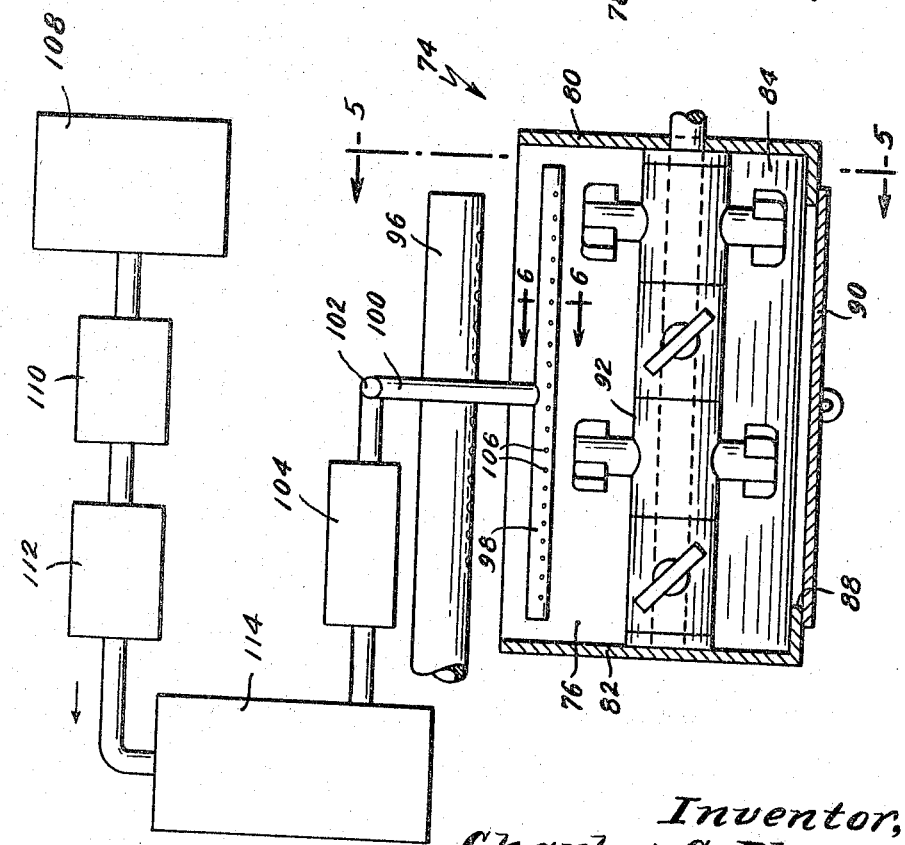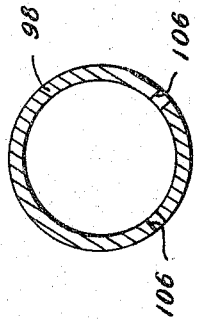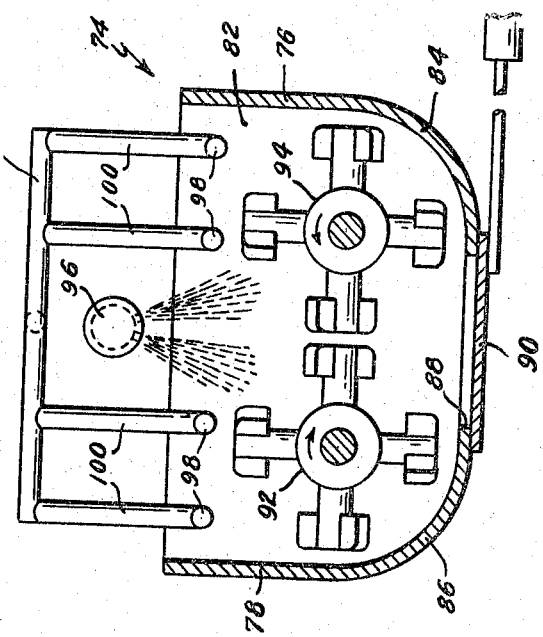

United States Patent Office 3,317,192
Patented May 2, 1967

3,317,192
METHOD AND APPARATUS FOR PREPARING A BITUMINOUS CONCRETE MIX
Charles C. Plumb, Cranston, R.I., assignor to Improved Pavements Corporation, Warwick, R.I., a corporation of Rhode Island
Filed Sept. 20, 1965, Ser. No. 492,986
3 Claims. (Cl. 259—147)

This application is a continuation-in-part of application Ser. No. 402,396, filed Oct. 8, 1964, now abandoned, and entitled, "Method and Apparatus for Preparing a Bituminous Concrete Mix."

The present invention relates to a method and apparatus for preparing a bituminous concrete mix. More particularly, the present invention relates to a method and apparatus for preparing a bituminous concrete mix that is applied as a roadway surface or the like, and that has increased life and improved wearing characteristics.

Bituminous concrete has been employed as a roadway surface for many years. Although the surface produced by the bituminous concrete is known to create better riding characteristics for vehicular traffic than cementous concrete, highway authorities will, in many instances, refuse to select bituminous concrete as a roadway surface because of the poor wearing characteristics thereof. Heretofore the bituminous concrete surface has reacted to heavy abuse from traffic by cracking and generally losing the desired resiliency thereof. This loss in ductility produces a brittle surface that results in hairline cracks and eventual breakdown of the roadway surface. Laboratory tests have shown that this breakdown of the bituminous concrete surface is the direct result of chemical reaction between the oxygen content of the air and the bitumen in the asphalt mix, resulting in lower penetration and ductility.

Bituminous concrete mix employed as paving is generally composed of a mineral aggregate that is graded to contain a minimum volume of voids. The mineral pieces or particles of aggregate are bonded together in the mix and held in relative position therein by a bitumen which may be an asphalt of tar. The mineral pieces as bonded together thereby constitute a plastic mass with the bitumen, the plastic mass comprising qualities of the mineral aggregate and qualities of the binding bitumen. In order that the mass retain the qualities that are essential when employed as a pavement, it is necessary that the chemical properties of the bitumen as applied to the mix be maintained.

In the customary practice of manufacturing a bituminous mix, the bitumen or asphalt undergoes certain changes which are normally due to the high temperatures involved in the mixing process and further due to the fact that the mixing is carried out in the presence of oxygen. As a result, in the presently known procedures in manufacturing a bituminous mix, the bitumen or asphalt undergoes certain physical and chemical changes which eventually cause hardening and brittleness in the asphalt, thereby destroying the essential qualities and characteristics necessary for use in a pavement. Thus, the asphalt loses plasticity and flexibility that are necessary in bonding the asphalt in the mix, the aggregate particles therein thus tending to lose their relative position in the mix, which results in the deterioration, raveling and cracking when the mix is laid on the road and acted upon by traffic and weather.

In the manufacture of a bituminous mix as presently carried out, the aggregate is dried and heated and then generally classified into size, as measured by standard screens. When the proper amount of the various classifications of the aggregate is placed in a mixing box or pug mill, predetermined amount of hot bitumen or asphalt is added to the mixing box or pug mill and mixed thoroughly with the aggregate contained therein. The resultant mix is a mixture of the aggregate and bitumen that while in the mixing box have a relatively high temperature of over 300° F. This high temperature and the agitating of the mineral aggregate and bitumen produces certain chemical and physical changes in the ingredients of the mix. These chemical and physical changes are exaggerated because of the presence of oxygen as contained in the air in the pug mill. There, it is seen that the mixing in the pug mill of the aggregate and bitumen is essentially in the presence of a high content of oxygen.

The present invention defines a departure over the procedures in manufacturing a bituminous mix as known heretofore and teaches a method of mixing an aggregate with a bitumen or asphalt in an inert environment so that there will be little or no oxidation or reduction in any of the ingredients being mixed. Thus, even though the aggregate and bitumen are mixed in a relatively high temperature, the mixing in an inert environment will result in a minimum of chemical and physical changes in the properties thereof, which avoids oxidation and hardening of the bitumen in the mix. The resulting mix has preserved therein the original qualities of the bitumen, such as the consistency and ductility thereof.

By preserving the consistency and ductility of the bitumen in the mix, when the mix is applied to a roadway or the like, the wearing characteristics of the bituminous concrete will be maintained and there will result a surface that is free of cracking and imperfections.

Accordingly, it is an object of the present invention to teach a method of preparing a bituminous concrete mix in a chemically inert environment in order to maintain the penetration of the asphalt cement contained in the mix after the dispensing of the mix from the mixer and the application thereof as a roadway surface or the like.

Another object of the invention is to provide apparatus for preparing a bituminous concrete mix, wherein the mixing operation is carried out in a chemically inert environment so as to maintain the penetration of the asphalt material contained in the resultant mix.

Still another object is to teach a method of mixing an aggregate and a liquid asphalt cement in a receptacle in a chemically inert environment in order to produce a bituminous concrete mix that has improved characteristics when used as a roadway surface or the like.

Still another object is to teach a method of removing oxygen from a mixing receptacle by introducing a gaseous medium under pressure therein.

Other objects, features and advantages of the invention will become apparent as the description thereof proceeds when considered in connection with the accompanying illustrative drawings.

In the drawings which illustrate the best mode presently contemplated by me for carrying out the present invention:

FIG. 1 is a top plan view with portions broken away of the mixing receptacle embodied in one form of the present invention;

FIG. 2 is a sectional view taken along lines 2—2 in FIG. 1;

FIG. 3 is a sectional view taken along lines 3—3 in FIG. 2;

FIG. 4 is a sectional view of a mixing receptacle as used in a modified form of the invention;

FIG. 5 is a sectional view taken along lines 5—5 in FIG. 4; and

FIG. 6 is a sectional view taken along lines 6—6 in FIG. 4.

Bituminous concrete as applied to roadway surfaces consists of an aggregate that is combined or mixed with an asphalt cement. The aggregate may consist of sand, gravel, stone or slag, while the asphalt cement contains a base of petroleum products and is applied in generally liquid-like form. Prior to the introduction of the aggregate into a mixing receptacle, the particles thereof are exposed to some processing so as to expel moisture therefrom. After the aggregate particles are exposed to a heating and drying process, they are discharged into an elevator for deposit onto a vibrating screen that classifies the particles and further directs the particles into storage bins in accordance with the classification or size thereof. The aggregate material is drawn upon as required and is transferred from the storage bins to a mixing receptacle for mixing with the asphalt material to form the bituminous concrete mix. The asphalt material is retained in convenient storage containers that are suitably heated to maintain the asphalt material in liquid form so that it may be transferred through conduits for introduction into the mixing receptacle by way of spray nozzles.

Referring now to the drawing, a mixing receptacle generally indicated at 10 is illustrated, and it will be understood that the mixing receptacle 10 is of that type that is incorporated in existing facilities that are employed for the manufacture and dispensing of a bituminous concrete mix. The mixing receptacle 10 includes side walls 12 and 14, end walls 16 and 18, a top wall 20 and bottom wall portions 22 and 24 that are integrally joined to the side walls 12 and 14, respectively. Slidably mounted on the top wall 20 is a gate 26 that is movable into closed position over an opening 30 that defines a top inlet for the aggregate and asphalt materials that are introduced into the receptacle 10. A piston rod 32 that is operatively interconnected to a piston located in a cylinder 36 is further interconnected to the gate 26, the gate 26 thereby being controlled by operation of the cylinder 36 to open and close the opening 30 as required. A discharge gate 40 is adapted to control the discharge of the mixed material through an opening 42 that is formed between the bottom portions 22 and 24, the discharge gate 40 being connected to a piston rod 42 that is in turn operated by means of a cylinder 44 and controls therefor. It is understood that this latter-described discharge gate construction is well known in the art.

In order to provide for suitable mixing of the asphalt material and the aggregate that is introduced into the receptacle 10, a mixing assembly is provided that includes spaced shafts 46 and 48 on which a plurality of hubs 50 and 52, respectively, are mounted. The shafts 46 and 48 are suitably journaled in the end walls 16 and 18, while projecting outwardly of the hubs 50 and 52 and joined thereto are a plurality of arms 54 and 56, respectively, on which paddles 58 and 60 are mounted. Located vertically above the receptacle 10 and extending a substantial portion of the length thereof and intermediate the side walls 12 and 14 is an inlet pipe 62 in which a plurality of spray nozzles 64 are located in spaced-apart relation. The inlet pipe 62 is joined to and communicates with a source of liquid asphalt cement and is adapted to convey the asphalt cement under pressure therein for discharge through the nozzles 64 and interiorly of the receptacle 10. It is understood that the aggregate will be introduced into the receptacle 10 at timed intervals upon opening of the inlet gate 26 and simultaneously at the time the asphalt material is introduced into the receptacle 10 through the inlet pipe 62 and the nozzles 64. The batch of aggregate and asphalt material is suitably mixed by counter rotation of the shafts 46 and 48 that are interconnected to any suitable power source, the paddles 58 and 60 producing the required mixing action for causing the asphalt material to coat the particles contained in the aggregate.

As previously described, the present invention teaches the concept of mixing the aggregate and the asphalt material in the chamber 10 in a chemically inert environment. In order to accomplish this purpose, an inlet conduit 66 is joined to the end wall 16 and communicates with an inlet port 68. An outlet conduit 70 is joined to the end wall 18 and communicates with a discharge port 72. In one form of the invention embodied herein, a gaseous medium is introduced into the receptacle 10 by way of the conduit 66 and inlet port 68. The gaseous medium is continuously circulated through the receptacle 10 during the mixing operation of the batch contained therein and is discharged through the discharge port 72 and discharge conduit 70. It is contemplated that nitrogen or other inert gases may be utilized as the gaseous medium that is introduced into the receptacle; and since this material diffuses relatively rapidly, any gases contained within the receptacle 10 will be quickly driven out with the nitrogen through the discharge port 72 and conduit 70. It is further contemplated to introduce the gaseous medium into the receptacle under pressure so that rapid circulation thereof will be achieved within the receptacle 10.

Mixing of the batch within the receptacle 10 is normally carried out in cycles, and in normal operation, a mixed batch is discharged through the discharge opening 40, and thereafter a new batch is introduced into the receptacle. For this reason, it is contemplated that the gaseous medium will be continuously circulated through the receptacle 10 even during the discharging of the batch therefrom and during the introduction of the fresh material therein.

By introducing the inert gases into the receptacle 10 during the mixing operation, thereby causing the mixing of the aggregate material and asphalt material to be carried out in an inert environment, the resultant bituminous mix is able to retain its original chemical structure. Further, by producing an inert environment in which the asphalt and aggregate are mixed, no chemical reactions are produced in the asphalt, and volatile fractions that are inherent in the constituency of the mix are prevented from escaping, the result then being that oxidation of the mix is prevented. By forming the mix in the manner described, after the mix is applied to a roadway or the like, penetration of the asphalt material is maintained and the ductility of the asphalt material is preserved so as to prevent brittleness and cracking of the roadway surface. It has been found that the resultant mix in which the method described herein is employed improves the penetration characteristics of the asphalt material with respect to normal type mixes almost 100 percent.

In order to further improve the penetration characteristics of the asphalt cement contained in the resultant bituminous mix that is discharged from the receptacle 10, the aggregate material may be pretreated prior to introduction into the receptacle 10. Because the aggregate material is porous, it is believed that oxygen may be contained therein when introduced into the receptacle. For this reason, the aggregate may be pretreated by introducing a gaseous medium into contact therewith reducing for the content therein. This pretreatment would occur just prior to the introduction of the aggregate into the receptacle.

Referring now to FIGS. 4, 5 and 6, a modified form of the invention is illustrated and includes a mixing receptacle generally indicated at 74 that is substantially similar to the receptacle 10 described above. The receptacle 74 includes side walls 76 and 78, end walls 80 and 82, and curved bottom portions 84 and 86 that are joined to the side walls 76 and 78, respectively. The receptacle 74 is open at the top, but the batch mixed therein is discharged through a bottom opening 88 under which a gate 90 is movably mounted. A mixing assembly of the type described above is located in the receptacle 74 and includes the counter rotating mixing units 92 and 94 which are provided with the conventional paddles. Located above the receptacle is a conduit 96 that communicates with a source of liquid asphalt and through the nozzles of which the asphalt material is directed for dispersal on the aggregate contained in the mixing receptacle 74.

In order to mix the asphalt material and the aggregate in the receptacle 74 in the absence of oxygen, an inert gas is introduced into the receptacle through a plurality of manifolds 98. The manifolds 98 are located inwardly in the interior of the receptacle 74 and communicate with vertical conduits 100 that are connected to a horizontal inlet pipe 102 through which the inert gas is directed from a control device 104. As shown in FIG. 4, the manifolds 98 are disposed entirely within the receptacle 74 and are adapted to direct the inert gas downwardly into contact with the mix during the mixing cycle. For this purpose, each of the manifolds 98 is formed with a plurality of nozzles 106 that discharge the inert gas therethrough at an angle of approximately 45 degrees. The nozzles 106 are spaced along the length of each of the manifolds at predetermined intervals and are of a sufficient diameter to permit the inert gas to be discharged therethrough at a specified velocity and dispersal. Preferably, the manifolds are formed of one-half inch tubing, and the nozzles 106 are spaced at five-inch intervals, the diameters of the nozzles being 7/32" for obtaining the most desirable results.

It has been found that nitrogen is the most effective purge gas and can be manufactured by a nitrogen generator 108 of any conventional type that can be installed as part of the operating equipment. Referring again to FIG. 4, the nitrogen generator 108 directs the nitrogen gas manufactured thereby to a receiver 110. A compressor 112 communicates with the receiver and increases the pressure of the nitrogen to the required pressure and then directs the pressurized nitrogen to an accumulator 114. The accumulator 114 communicates with the controller 104 which can be set for automatic operation to draw upon the nitrogen as required during each cycle of operation of the receptacle 74.

In use of the apparatus illustrated in FIGS. 4, 5 and 6, a preferred method of practicing the process embodied therein is to first introduce the aggregate material into the receptacle 74 from an exterior source. The nitrogen under pressure is then directed for a brief period into the receptacle into contact with the aggregate and prior to introducing the liquid asphalt material therein. This preconditioning of the aggregate and the interior of the receptacle may be carried out for ten to fifteen seconds. Thereafter, the liquid asphalt is introduced into the receptacle, and during the mixing operation the gas stream is directed into the receptacle for approximately fifteen to thirty seconds after the liquid asphalt is introduced therein. The preconditioning of the aggregate by the gas stream and the mixing of the aggregate with the liquid asphalt in the presence of the gas stream acts to remove air from the receptacle and from the mix so that the mixing operation is carried out in an inert chemical environment. Since the receptacle is open at the top during the mixing operation, it is seen that mixing in the inert environment is carried out without any appreciable increase in pressure in the receptacle. Immediately following the mixing operation, the mix is dumped through the opening 88 upon operation of the door 90 and is carried by a truck to the site of use.

While there is shown and described herein certain specific structure embodying the invention, it will be manifest to those skilled in the art that various modifications and rearrangements may be made without departing from the spirit and scope of the underlying inventive concept and that the same is not limited to the particular form herein shown and described except insofar as indicated by the scope of the appended claims.

What is claimed is:

1. In a process of manufacturing a bituminous concrete mix, comprising the steps of introducing a batch of heated aggregate into a relatively fixed mixing receptacle having an open top constantly exposed to atmosphere, introducing a heated asphalt material into said open-top mixing receptacle for mixing with said aggregate to form said bituminous concrete mix, and treating the open-top mixing receptacle and the aggregate and asphalt material contained therein by introducing an inert gaseous medium into said open-top receptacle for at least a portion of the mixing cycle and while the aggregate and asphalt material are being mixed, whereby the mixing of the asphalt with the aggregate is carried out in an inert environment so that oxidizing impurities contained in the mix and mixing area are removed therefrom, the step of treating the open-top mixing receptacle and aggregate and asphalt material contained therein in an inert environment including the steps of introducing the inert gaseous medium into said open-top receptacle just prior to the introduction of said asphalt material therein for preconditioning said open-top receptacle, and continuing the passage of said inert gaseous medium into said open-top receptacle in a free-flow pattern into said open-top receptacle for a predetermined period after introduction of the asphalt material therein but without materially increasing the pressure in said open-top receptacle.

2. In apparatus for producing a bituminous concrete mix, a relatively fixed receptacle having an open top constantly exposed to atmosphere and through which an aggregate material is introduced, a bottom door, means for controlling movement of said bottom door for discharging a batch of the mix contained in said open-top receptacle therefrom, means for introducing an asphalt material into said open-top receptacle into contact with said aggregate material, means for mixing the aggregate material with said asphalt material, means independent of said asphalt material introducing means for introducing an inert gaseous medium into said open-top receptacle for removing oxidizing impurities therefrom and for providing an inert environment during mixing of said asphalt and aggregate materials including at least one manifold located interiorly of said receptacle and above said mixing means, said manifold directing said gaseous medium into said open-top receptacle in a free-flow pattern and into contact with the asphalt and aggregate materials during the mixing thereof but without appreciably increasing the pressure in said receptacle during the mixing of said asphalt and aggregate material.

3. In a process of maufacturing a bituminous concrete mix, comprising the steps of introducing a batch of aggregate material into a relatively fixed mixing receptacle having an open top constantly exposed to atmosphere, introducing a heated asphalt material into said open-top mixing receptacle through a first supply means for mixing with said aggregate material to form said bituminous concrete mix, treating the interior of the open-top mixing receptacle and the aggregate and asphalt materials contained therein with an inert gaseous medium that is introduced into the open-top receptacle through a second supply means for at least a portion of the cycle that the asphalt and aggregate materials are being mixed, so that the mixing in said open-top receptacle is carried out in an inert environment, providing for flow of said gaseous medium into said open-top receptacle in a free-flow pattern during at least a portion of the mixing cycle when said asphalt and aggregate materials are being mixed so as to remove oxidizing impurities from said mix, said steps of introducing the batch of aggregate material into said open-top receptacle, introducing the asphalt material into said open-top receptacle for mixing with the aggregate material, and treating the aggregate and asphalt materials as they are being mixed with an inert gaseous medium all being performed without interruption in the cycle and without any appreciable increase in pressure within the open-top receptacle.

References Cited by the Examiner

UNITED STATES PATENTS

| | | | |
|---|---|---|---|
| 1,363,230 | 12/1920 | Clark | 259—158 |
| 1,791,109 | 2/1931 | Wittenberg | 259—148 |
| 1,987,243 | 1/1935 | Madsen | 259—148 |
| 2,152,798 | 4/1939 | Fuller | 259—146 |

WALTER A. SCHEEL, *Primary Examiner.*

ROBERT W. JENKINS, *Examiner.*